US006623018B2

(12) United States Patent
Fireman et al.

(10) Patent No.: US 6,623,018 B2
(45) Date of Patent: Sep. 23, 2003

(54) LOW PROFILE SNOW SLED HAVING THIN WALLS AND HIGH STRUCTURAL STABILITY

(75) Inventors: Andrew F. Fireman, North Bethesda, MD (US); Thomas B. Eckert, Rancho Cucumonga, CA (US)

(73) Assignee: Riva Sports, Inc., Rockville, MD (US)

( * ) Notice: Subject to any disclaimer, the term of this patent is extended or adjusted under 35 U.S.C. 154(b) by 0 days.

(21) Appl. No.: 09/972,718

(22) Filed: Oct. 5, 2001

(65) Prior Publication Data

US 2003/0067128 A1 Apr. 10, 2003

(51) Int. Cl.[7] .............................................. B62B 19/00
(52) U.S. Cl. .......................................... 280/18; 280/19
(58) Field of Search ........................... 280/18, 18.1, 19, 280/21.1, 28, 27, 28.12, 28.13, 11.18

(56) References Cited

U.S. PATENT DOCUMENTS

| | | | | |
|---|---|---|---|---|
| 3,455,571 A | * | 7/1969 | Dallera et al. | 280/18 |
| 3,512,195 A | * | 5/1970 | Porsche | 280/18 |
| 3,865,391 A | * | 2/1975 | Melnick et al. | 280/18 |
| 3,884,490 A | * | 5/1975 | Hellman | 280/18 |
| 4,028,761 A | * | 6/1977 | Taylor | 280/18 |
| 4,561,664 A | * | 12/1985 | Cashmere | 280/18 |
| 4,571,195 A | * | 2/1986 | Brooks, Jr. | D12/11 |
| D392,218 S | * | 3/1998 | Rausch | 280/14.28 |
| 5,957,471 A | * | 9/1999 | Weeks | 280/18 |
| 6,139,031 A | * | 10/2000 | Wingard | 280/14.28 |

FOREIGN PATENT DOCUMENTS

| | | | | |
|---|---|---|---|---|
| DE | 3338363 A1 | * | 5/1985 | B62B/15/00 |
| FR | 2687113 A1 | * | 8/1993 | B62B/13/06 |

* cited by examiner

*Primary Examiner*—Brian L. Johnson
*Assistant Examiner*—Kelly E Campbell
(74) *Attorney, Agent, or Firm*—Steven N. Fox, Esq.

(57) ABSTRACT

A snow sled comprising a unitary body comprising a top portion having a seat portion, a bottom portion engageable with the snow, a rear portion, a front portion, and first and second side portions. The bottom portion and the top portion extend along a longitudinal axis substantially from the rear portion to the front portion. The top portion comprises a first wall portion. The lower portion comprises a second wall portion. The first wall portion of the top portion is spaced less than substantially four inches from the second wall portion of the bottom portion along said longitudinal axis. The top portion may further comprise first and second foot rest portions. The first and second foot rest portions comprise first and second wall portions. The bottom portion may further comprises a third wall portion. Application of a downward force to the first and second foot rest portions cause the first and second wall portions of the top portion to deflect and come in contact with the third wall portion of the bottom portion to provide structural stability.

15 Claims, 3 Drawing Sheets

LOW PROFILE SNOW SLED HAVING THIN WALLS AND HIGH STRUCTURAL STABILITY

FIELD OF THE INVENTION

The present invention relates snow sleds. More particularly, the present invention relates to snow sleds made from plastic.

BACKGROUND OF THE INVENTION

In recent years, snow sleds made of plastic have become quite popular. Plastic snow sleds are lighter than conventional metal and/or wooden snow sleds. There is a continuing need to develop a low cost plastic snow sled that is lightweight and structurally stable.

SUMMARY OF THE INVENTION

One object of the present invention was to design a snow sled that used significantly less plastic than conventional snow sleds thereby reducing the overall weight and cost of the snow sled.

Another object of the present invention was to design a snow sled that used significantly less plastic than conventional snow sled while still providing high structural stability.

The present invention is a snow sled comprising a unitary body comprising a top portion having a seat portion, a bottom portion engageable with the snow, a rear portion, a front portion, and first and second side portions. The bottom portion and the top portion extend along a longitudinal axis substantially from the rear portion to the front portion. The top portion comprises a first wall portion. The lower portion comprises a second wall portion. The first wall portion of the top portion is spaced less than substantially four inches from the second wall portion of the bottom portion along said longitudinal axis. The top portion may further comprise first and second foot rest portions. The first and second foot rest portions comprise first and second wall portions. The bottom portion may further comprises a third wall portion. Application of a downward force to the first and second foot rest portions cause the first and second wall portions of the top portion to deflect and come in contact with the third wall portion of the bottom portion to provide structural stability.

BRIEF DESCRIPTION OF THE DRAWINGS

The following detailed description of the invention will be more fully understood with reference to the accompanying drawings in which.

DETAILED DESCRIPTION OF THE PREFERRED EMBODIMENTS

Figure 1:
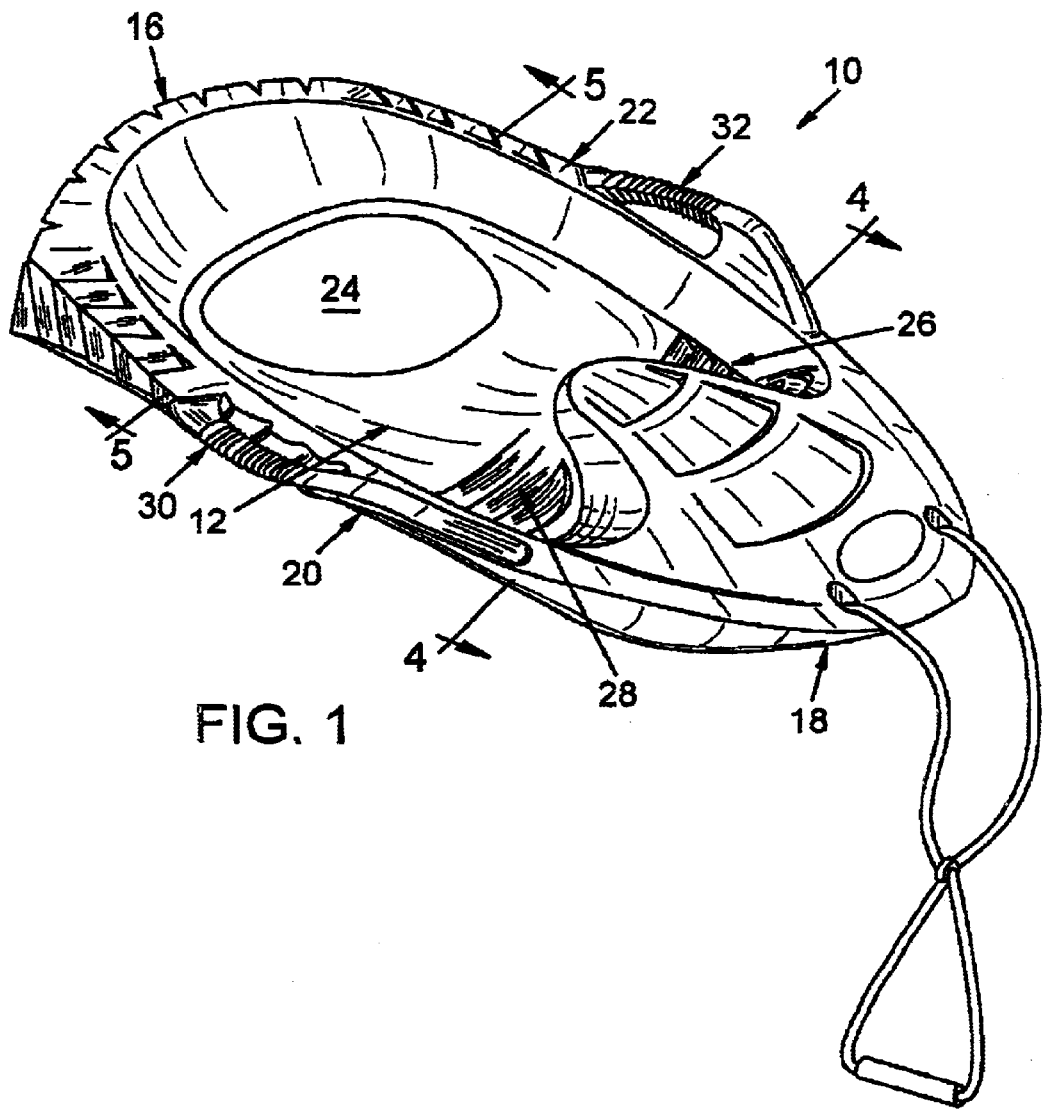
FIG. 1 is a perspective of the snow sled of the present invention.
Figure 2:
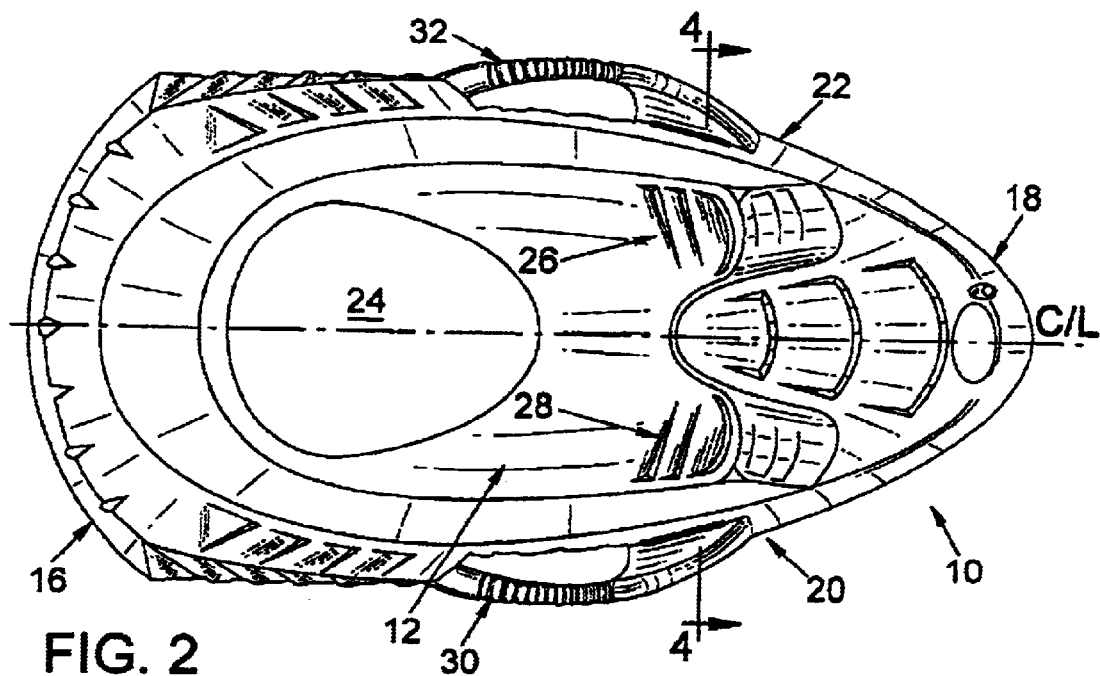
FIG. 2 is top plan view of the snow sled.
Figure 3:
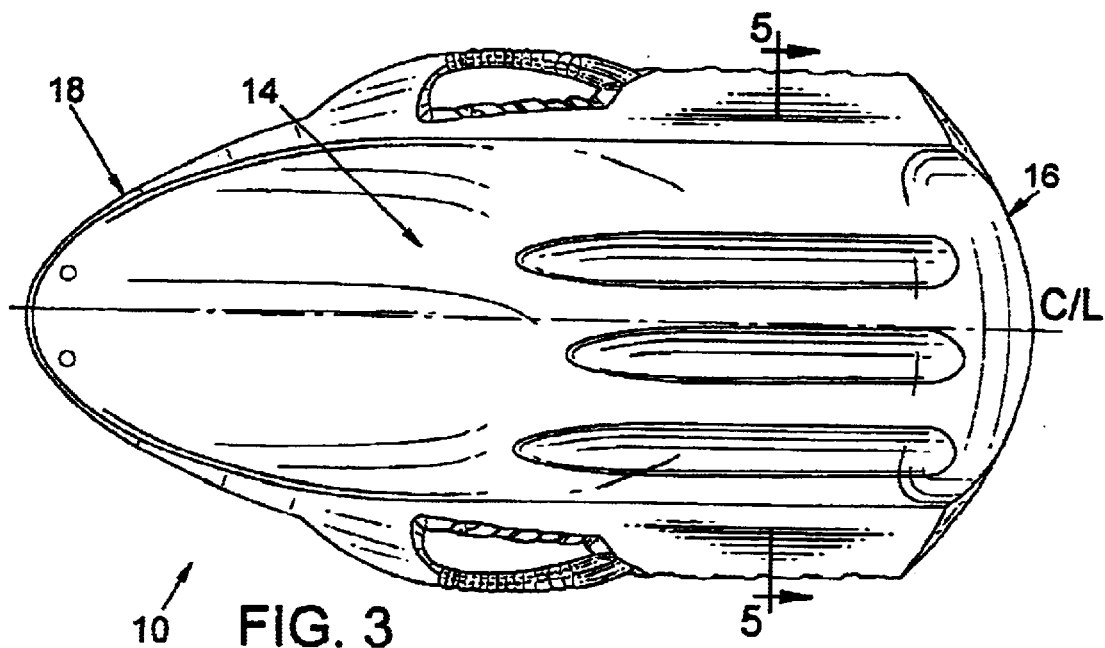
FIG. 3 is a bottom view of the snow sled.

Referring to FIGS. 1–3, where a snow sled 10 of the present invention is shown. The snow sled 10 generally comprises a top portion 12, a bottom portion 14, a rear portion 16, a front portion 18, and first and second side portions 20 and 22. The bottom portion 14 and the top portion 12 extend along a longitudinal axis from the rear portion 16 to the front portion 18. The top portion 12 comprises a seat portion 24 adapted to receive a person and first and second foot rest portions 26 and 28 adapted to receive the person's feet. The side portions 20 and 22 comprise handles 30 and 32, respectively, which may be grasped by the person.

Figure 4:
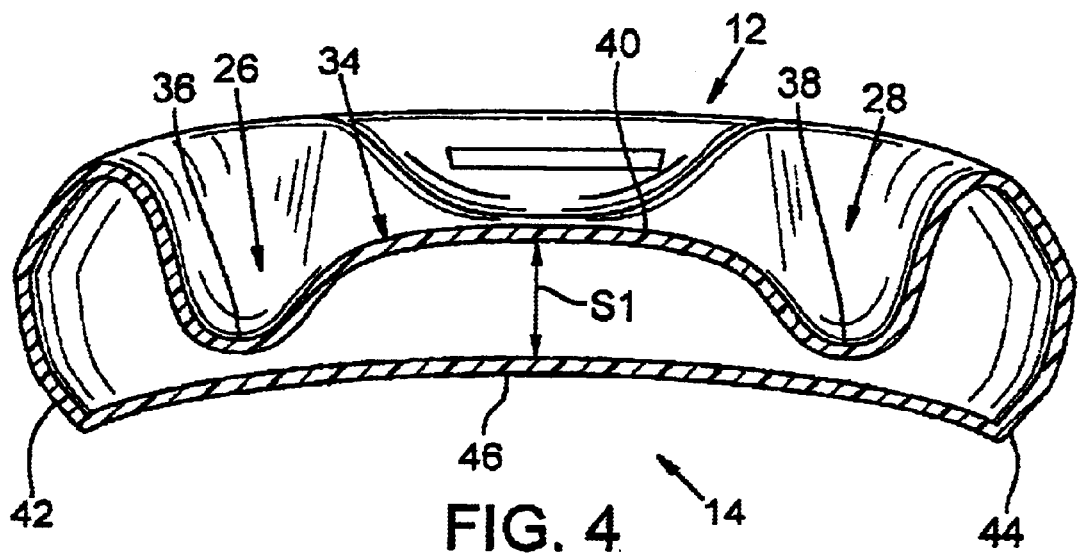
FIG. 4 is a cross-section view taken along line 4—4 of FIG. 2.

Referring to FIG. 4, the top portion 12 generally is formed with a wall 34 comprising concave shaped wall portions 36 and 38 which form the foot rest portions 26 and 28, respectively, and a convex shaped center wall portion 40. The bottom portion 14 generally comprises first and second rail portions 42 and 44. The rail portions 42 and 44 are shaped and adapted to engage with the snow. The bottom portion 14 further comprises a generally concave shaped wall 46 extending from the first rail portion 42 to the second rail portion 44. The wall portion 40 of the top portion 12 is spaced less than substantially four inches from the wall portion 46 of the bottom portion 14 along the longitudinal axis as designated by the reference numeral S1. Application of a downward force to the first and second foot rest portions 26 and 28 by the person's feet cause the wall portions 36 and 38 of the top portion 12 to deflect and come in contact with the wall portion 46 of the bottom portion 14 to provide structural stability to the front portion 18 of the snow sled 10.

Figure 5:
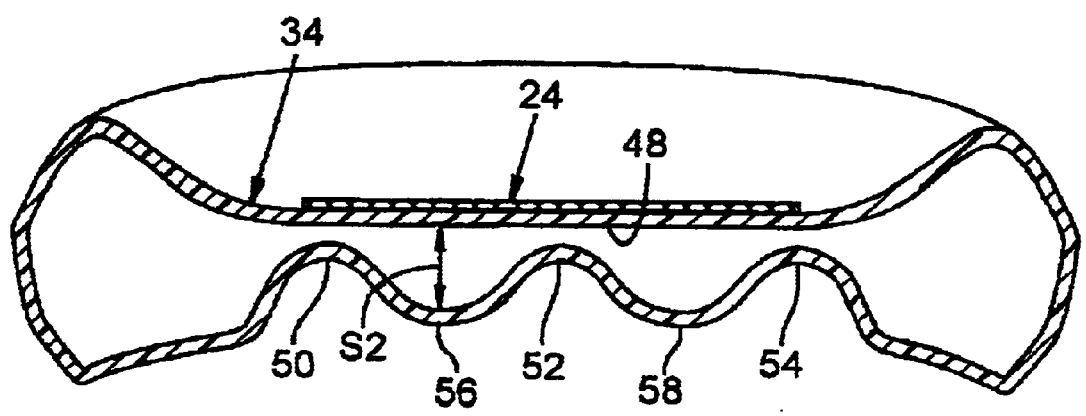
FIG. 5 is a cross-section view taken along line 5—5 of FIG. 2.

Referring to FIG. 5, wherein the wall 34 of top portion 12 comprises a wall portion 48 disposed on which is the seat portion 24. The bottom portion 14 comprises concave shaped wall portions 50, 52, and 54. When a person sits on the seat portion 24, a downward force is applied causing the wall portion 48 to come in contact with the wall portions 50, 52, and 54 to provide structural stability to the rear portion 16 of the snow sled 10. The wall portion 48 of the top portion 12 is spaced less than substantially four inches from the wall portions 56 and 58 of the bottom portion 14 along the longitudinal axis as designated by the reference numeral S2.

The snow sled 10 is preferably made of substantially rigid plastic and formed by a blow molding process. All of the walls are designed to have a thickness in the range of 0.060 inches to 0.200 inches that result in a lightweight snow sled. The overall height of the snow sled 10 is less than eight (8) inches. The structural stability resulting from the deflection of the foot rest portions 26 and 28 and the seat portion 24, further with the small spacing between walls, allow the snow sled 10 to be formed using thin walls thereby reducing the amount of raw material, processing times, and overall manufacturing cost. Still further, the low profile or overall height of the sled 10 achieved by the small spacing between walls provides a snow sled that is easily handled and transported.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. A snow sled for use on snow comprising an unitary body comprising a top portion having a seat portion, a bottom portion engageable with the snow, a rear portion, a front portion, and first and second side portions; said top and bottom portions extending along a longitudinal axis substantially from said rear portion to said front portion; said top portion comprises first and second foot rest portions having first and second foot rest walls, respectively; said bottom portion comprises a bottom wall; application of a downward force to said first and second foot rest portions cause said first and second foot rest walls, respectively, to deflect and come in contact with said bottom wall to provide structural stability.

2. The snow sled of claim 1, wherein said top portion further comprises a seat wall disposed below said seat portion and said bottom portion further comprises first and second support walls; application of a downward force to said seat portion causes said seat wall to deflect and come in contact with said first and second bottom support walls to provide structural stability.

3. The snow sled of claim 2, wherein said bottom portion comprises a third bottom support wall; application of a downward force to said seat portion causes said seat wall to deflect and come in contact with said third bottom support wall to provide structural stability.

4. The snow sled of claim 3, wherein each of said first and second foot rest walls and said first, second and third bottom support walls are concave shaped.

5. The snow sled of claim 4, wherein each of said first and second foot rest walls, said seat wall, and first, said and third bottom support walls have a thickness in the range of 0.060 inches to 0.200 inches.

6. The snow sled of claim 5, wherein said first and second foot rest walls are disposed at opposite sides of said longitudinal axis.

7. The snow sled of claim 6, wherein said first and second foot rest walls are substantially adjacent said first and said side portions, respectively.

8. A snow sled for use on snow comprising an unitary body comprising a top portion having a seat portion, a bottom portion engageable with the snow, a rear portion, a front portion, and first and second side portions; said top and bottom portions extending along a longitudinal axis substantially from said rear portion to said front portion; said top portion comprises a seat wall disposed below said seat portion; said bottom portion comprises substantially rigid first and second bottom support walls; application of a downward force to said seat portion causes said seat wall to deflect and come in contact with said first and second bottom support walls to provide structural stability.

9. The snow sled of claim 8, wherein said top portion further comprises first and second foot rest portions having first and second foot rest walls, respectively, and said bottom portion further comprises a bottom wall; application of a downward force to said first and second foot rest portions cause said first and second foot rest walls, respectively, to deflect and come in contact with said bottom wall to provide structural stability.

10. The snow sled of claim 9, wherein said bottom portion comprises a third bottom support wall; application of a downward force to said seat portion causes said seat wall to deflect and come in contact with said third bottom support wall to provided structural stability.

11. The snow sled of claim 10, wherein each of said first and second foot rest walls and said first, second and third bottom support walls are concave shaped.

12. The snow sled of claim 11, wherein each of said first and second foot rest walls, said seat wall, and first, said and third bottom support walls have a thickness in the range of 0.060 inches to 0.200 inches.

13. The snow sled of claim 12, wherein said first and second foot rest walls are disposed at opposite sides of said longitudinal axis.

14. The snow sled of claim 13, wherein said first and second foot rest walls are substantially adjacent said first and said side portions, respectively.

15. The snow sled of claim 14, wherein said top portion is spaced less than 4.0 inches apart from said bottom portion.

\* \* \* \* \*